United States Patent [19]

Strauss

[11] Patent Number: 5,555,350
[45] Date of Patent: Sep. 10, 1996

[54] MULTI-INTERPRETER PRINTER AND PROCESS INCLUDING RECOGNITION OF OUT-OF-BAND CHARACTERS

[75] Inventor: David W. Strauss, Needham, Mass.

[73] Assignee: Xionics Document Technologies, Inc., Burlington, Mass.

[21] Appl. No.: 417,220

[22] Filed: Apr. 5, 1995

[51] Int. Cl.⁶ ................................................... G06K 15/00
[52] U.S. Cl. ........................................... 395/112; 395/114
[58] Field of Search ........................... 395/112, 114, 395/102, 101, 105, 107, 109, 110, 113, 117, 150, 145, 148, 500; 347/142; 358/402, 442, 445, 470, 467, 468, 407; 400/61, 62, 76

[56] References Cited

U.S. PATENT DOCUMENTS

| | | | |
|---|---|---|---|
| 5,075,874 | 12/1991 | Steeves et al. | 395/112 |
| 5,165,014 | 11/1992 | Vassar | 395/112 |
| 5,222,200 | 6/1993 | Callister et al. | 395/112 |
| 5,228,118 | 7/1993 | Sasaki | 395/114 |
| 5,293,466 | 3/1994 | Bringmann | 395/112 |
| 5,303,336 | 4/1994 | Kageyama et al. | 395/112 |
| 5,392,419 | 2/1995 | Walton | 395/114 |

*Primary Examiner*—Mark R. Powell
*Assistant Examiner*—Dov Popovici
*Attorney, Agent, or Firm*—Stuart P. Meyer

[57] ABSTRACT

A multi-interpreter printer recognizes out-of-band characters by measuring pauses in applied data streams and examining as candidate out-of-band characters data portions separated in time from other data by pauses exceeding predetermined durations. Pauses before-and after the candidate out-of-band characters may be examined, and different thresholds may be used for pre-character and post-character pauses.

6 Claims, 2 Drawing Sheets

MULTI-INTERPRETER PRINTER AND PROCESS INCLUDING RECOGNITION OF OUT-OF-BANK CHARACTERS

BACKGROUND AND FIELD OF THE INVENTION

This invention relates generally to the field of computer printers, and specifically to a system and process for recognizing out-of-band characters in data streams applied to a printer by one or more computers in more than one printer control language.

It has become common in the industry for printers to be designed to accept more than one printer control language. For example, many popular computer printers are capable of operating on data both in the popular page description language (PDL) known as PCL5 and in the PDL known as POSTSCRIPT. Other printers are capable of operating not only with such PDLs, but also with other control languages, such as the one known as PJL.

Early multi-interpreter printers required manual switching from one language to another. More recent devices, however, typically employ some form of language-sensing technology. A goal of such printers is to appear to the end user as if the printer were designed exclusively for the language the user is providing. For example, such a printer should perfectly emulate a POSTSCRIPT printer when sent POSTSCRIPT data, and should perfectly emulate a PCL printer when sent PCL data.

Unfortunately, different languages allow for certain characters to be interpreted differently when presented in the middle of a data stream. For instance, in a POSTSCRIPT printer, the character "control-C" (ASCII character no. 3) is supposed to be acted upon and removed from the data stream as soon as it is received, and is supposed to be interpreted as a command from the user to abort the current printing job. Similarly, a "control-T" (ASCII character no. 20) is supposed to be acted upon and removed from the data stream as soon as it is received, and is supposed to be interpreted as a command from the user to send a status report. Such characters, which are processed out of turn in the data stream, are referred to as "asynchronous events," or "out-of-band" ("OOB") characters or events. In some languages, groups of special characters are used to signal OOB events. For convenience of notation herein, a single character or a set of characters used for signaling an OOB event will be referred to as an "OOB character."

OOB characters would not be problematic in a multi-interpreter printer if the printer was informed that the data stream in which such characters were received would contain only one type of data, e.g., POSTSCRIPT data. However, in typical use of such printers there is no way to tell whether the incoming data is in one language or another, and it is common for a data stream to include, for example, both PCL and POSTSCRIPT data interspersed. Processing problems result when such characters are OOB in some of the languages recognized by the printer and not others.

To address such problems, some printers require the user to manually select which language the printer is to recognize, either by a switch on the printer or a menu selection.

Other printers avoid these problems by using nonstandard emulation of one or more of the recognized languages to remove ambiguity in processing. For example, if two languages make use of the "control-T" character, the printer may choose to ignore the "control-T" character altogether or may interpret a single "control-T" as corresponding to a first language and a repeated "control-T" as corresponding to a second language. A disadvantage of this method is imperfect emulation of one or more of the languages by the printer.

Yet a third method is to pre-process the incoming data stream by scanning ahead for OOB characters while at the same time attempting to determine which PDL the data stream belongs to. Since the entire data stream is processed to some extent in turn under this approach, OOB characters are not truly processed asynchronously, but only in a pseudo-asynchronous manner. Thus, additional processing overhead is required to determine unambiguously the language to which an OOB character pertains.

Yet another approach is to treat all data as synchronous data, and to simply process OOB characters in turn in the data stream. However, this approach sharply reduces the benefits of some commands, such as a command to abort a job that is currently being processed or to provide a status report on a job.

Thus, it would be desirable for a printer to be able to recognize and process OOB characters without the increased complexity, increased overhead, and deviation from perfect emulation that have characterized known techniques.

SUMMARY OF THE INVENTION

In accordance with the present invention, a process for recognizing OOB characters in a data stream includes measuring a pause in the data stream, tagging a portion of the data stream as a possible OOB character in response to the pause exceeding a predetermined threshold, and recognizing the possible OOB character as an actual OOB character in response to correspondence between the possible OOB character and one of a set of known OOB characters.

In another aspect of the invention, the pause is measured before the portion.

In yet another aspect of the invention, the pause is measured after the portion.

In still another aspect of the invention, a process for recognizing OOB characters in a data stream includes measuring pre-character and post-character pauses, comparing candidate characters with a set of known OOB characters, and recognizing a candidate character as an OOB character if the pre-character pause exceeds a first threshold duration, the post-character pause exceeds a second threshold duration, and the candidate character corresponds to one of the set of OOB characters.

In a further aspect of the invention, a printer includes a pause detector for determining a pause in an applied data stream, an OOB character recognizer, and an OOB event generator. The OOB event generator produces an OOB signal if a pause relative to a portion in the data stream exceeds a threshold duration, and the portion matches one of a known set of OOB characters.

In still a further aspect of the invention, a printer includes a first pause detector for determining a pre-character pause, a second pause detector for determining a post-character pause, an OOB character recognizer, and a OOB event generator, the OOB event generator producing an OOB signal if the first pause detector signals that the pre-character pause exceeds a first duration, the second pause detector signals that the post-character pause exceeds the second duration, and the OOB character recognizer indicates that the character matches one of a set of known OOB characters.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF A PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
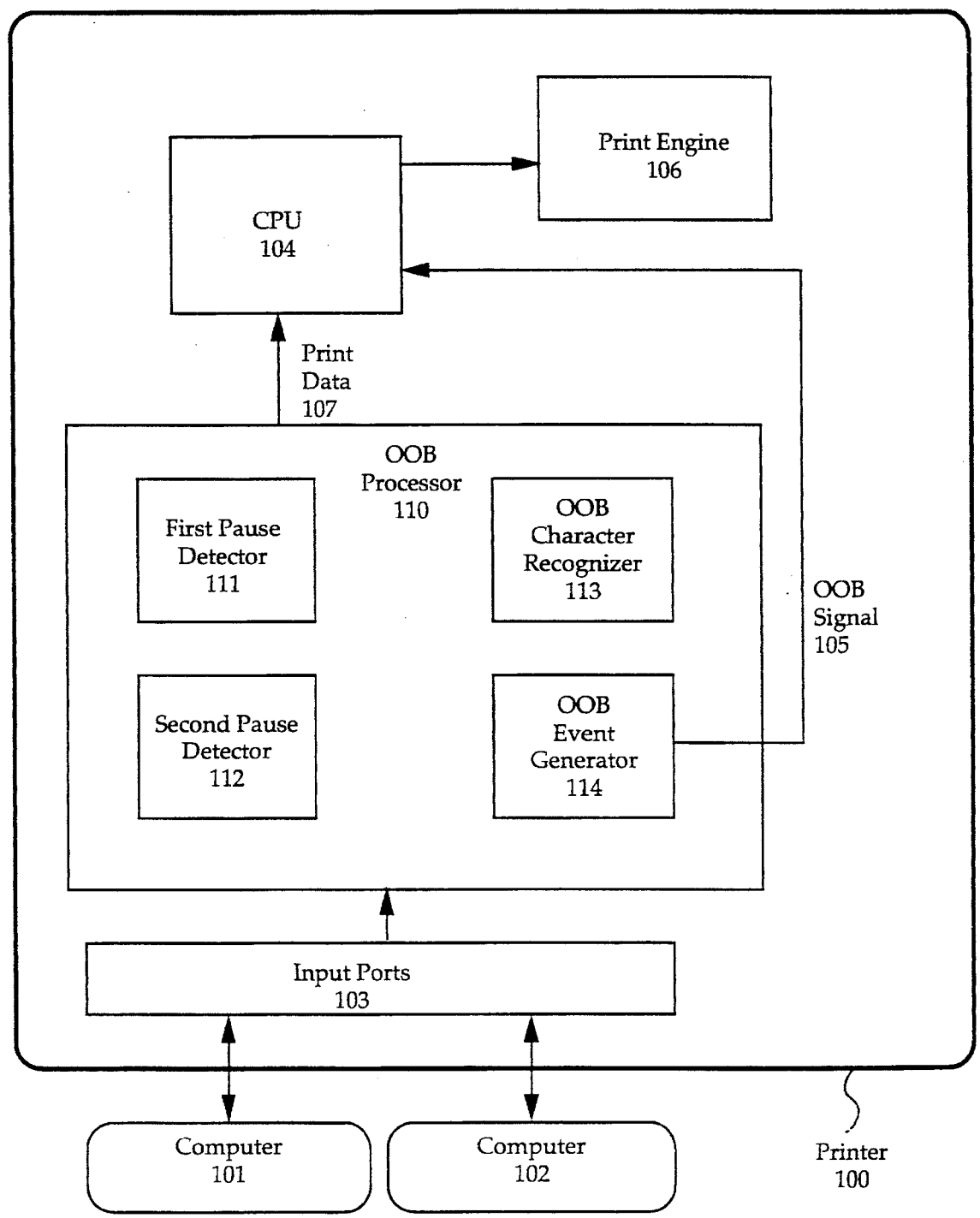
FIG. 1 is a block diagram of a printer (100) in accordance with the present invention.

Referring now to FIG. 1, there is shown a block diagram of a printer 100 for printing data applied by computers 101, 102 in accordance with the above invention. The printer 100 includes input ports 103, an OOB processor 110, a central processing unit (CPU) 104, and a print engine 106. OOB processor 110 includes a first pause detector 111, a second pause detector 112, an OOB character recognizer 113, and an OOB event generator 114.

In general terms, printer 100 operates by receiving data from computers 101 and 102 at input 103, passing the data through OOB processor 110 to CPU 104, processing the data in CPU 104 and sending the processed print data 107 to be printed using conventional print engine 106. OOB processor 110 examines the data passing through it. Specifically, pause detectors 111 and 112 search for pauses before and after each character of such data that would suggest that the character might be an OOB character. OOB character recognizer 113 checks candidate OOB characters against a known set of OOB characters. When OOB characters are recognized, OOB event generator 114 generates corresponding OOB signals 105.

In a preferred embodiment, the connection between each of computers 101, 102 and input ports 103 is made by a standard communication channel such as RS-232 serial, Centronics parallel, or IEEE 1284-compliant bi-directional parallel. The type of connection used between computer 101 and input ports 103 need not be the same as that used between computer 102 and ports 103.

Commonly, the data produced by a computer, e.g., 101, for printing on an attached printer, e.g., 100, originates from a software application program operating on computer 101, such as a word processor program, a spreadsheet program, or a graphics program. Conventional printer driver software within computer 101 converts the data to be printed into a form compatible with the type of printer being used, and conventional input/output system software, e.g., BIOS software, routes the data to the proper port of computer 101 for transmission to printer 100 and controls the data transfer with printer 100. In some conventional computers, e.g., 101, terminal emulation software permits communication directly from an application program to an output port of the computer using only the system software and bypassing the printer driver.

CPU 104 of printer 100 is configured to provide the conventional elements of a printer input/output system (or "PBIOS"), an intermediate host input/output interface (or "HIO"), a data stream manager (or "DMAN"), and one or more printer language interpreters (or "PLIs"). In operation, the PBIOS receives data from a computer, e.g., 101, and places it in temporary low-level buffers. The HIO acts on OOB characters by processing the OOB events that the OOB characters represent in the corresponding PLI. The, DMAN directs the flow of data from the HIO to the PLIs and determines which PLI should be run at any time.

In accordance with the present invention, an OOB processor 110 is used to examine a data stream as it moves from input ports 103 to CPU 104. OOB processor 110 passes most data applied from input ports 103 through to CPU 110 as print data 107, but examines the timing and content of such data to determine when OOB characters appear in the data stream.

In typical operation of printer 100 with computers 101 and 102, a user of a computer, e.g., 101, creates a document using an application program and then requests that such document be printed using printer 100. Triggered by that request, a print driver in computer 101 converts the representation of the document provided by the application program into a PLI representation and then transfers the PLI representation to the printer 100, using the Operating system of computer 101 and one of the input/output channels of computer 101. After the data transfer occurs, the user may wish to determine the status of the print job or may wish to terminate the print job, and does so by sending the appropriate OOB character to the printer. The OOB character is not transmitted to the printer 100 until the corresponding communication channels have obtained access authorization, and new access authorization will not be available for subsequent data transfers until some time after the OOB character is transmitted. It is therefore expected that there will generally be a time delay between the end of document data and a transmitted OOB character, and there will also generally be a time delay after a transmitted OOB character before the beginning of subsequent document data.

Accordingly, in operation the OOB processor 110 makes use of a first pause detector 111 to measure time delays and determine whether such delays exceed a predetermined threshold duration. In a preferred embodiment, a threshold duration of 500 milliseconds is employed, but other delays could also be used in accordance with the present invention. Any data appearing after a period of no data that exceeds this threshold is examined by an OOB character recognizer 113 to determine whether such data matches OOB characters supported by printer 100, i.e., those characters that are considered OOB characters in any of the PLIs provided by CPU 104. If a correspondence is found, a second pause detector 112 is used to measure the delay after the possible OOB character and before the subsequent character in the data stream. If this delay exceeds a second threshold duration, 500 milliseconds in a preferred embodiment, second pause detector 112 signals OOB event generator 114 to transmit an OOB signal 105, corresponding to the recognized OOB character, to CPU 104 for conventional processing by the HIO, as discussed above. If the second pause detector does not detect a delay that exceeds the second threshold duration, the character is assumed not to represent an OOB character and is transmitted in order along with the other data in the data stream. As with the first delay threshold, the second delay threshold setting is not critical, and may differ considerably from the 500 millisecond duration used in the preferred embodiment described above.

In alternate embodiments, the order of processing may be different from that described above. For example, any data for which the first pause detector indicates a longer-than-threshold delay may next be processed by the second pause detector before a determination is made whether to apply such data to OOB character recognizer 113. In this alternate embodiment, only sufficiently long pauses before and after a character cause the content of the character to be examined.

In another alternate embodiment, only the first pause detector is used. In yet another alternate embodiment, only the second pause detector is used.

In a preferred embodiment, OOB processor 110, including first pause detector 111, second pause detector 112, OOB character recognizer 113, and OOB event generator 114 are implemented by a programmed general purpose microprocessor. In this embodiment, the same programmed general purpose microprocessor is used to implement both CPU 104 and OOB processor 110. It should be recognized, however, that OOB processor 110 could also be implemented using a dedicated programmed microprocessor or could be implemented entirely in hardware, for example by using discrete digital components.

Figure 2:
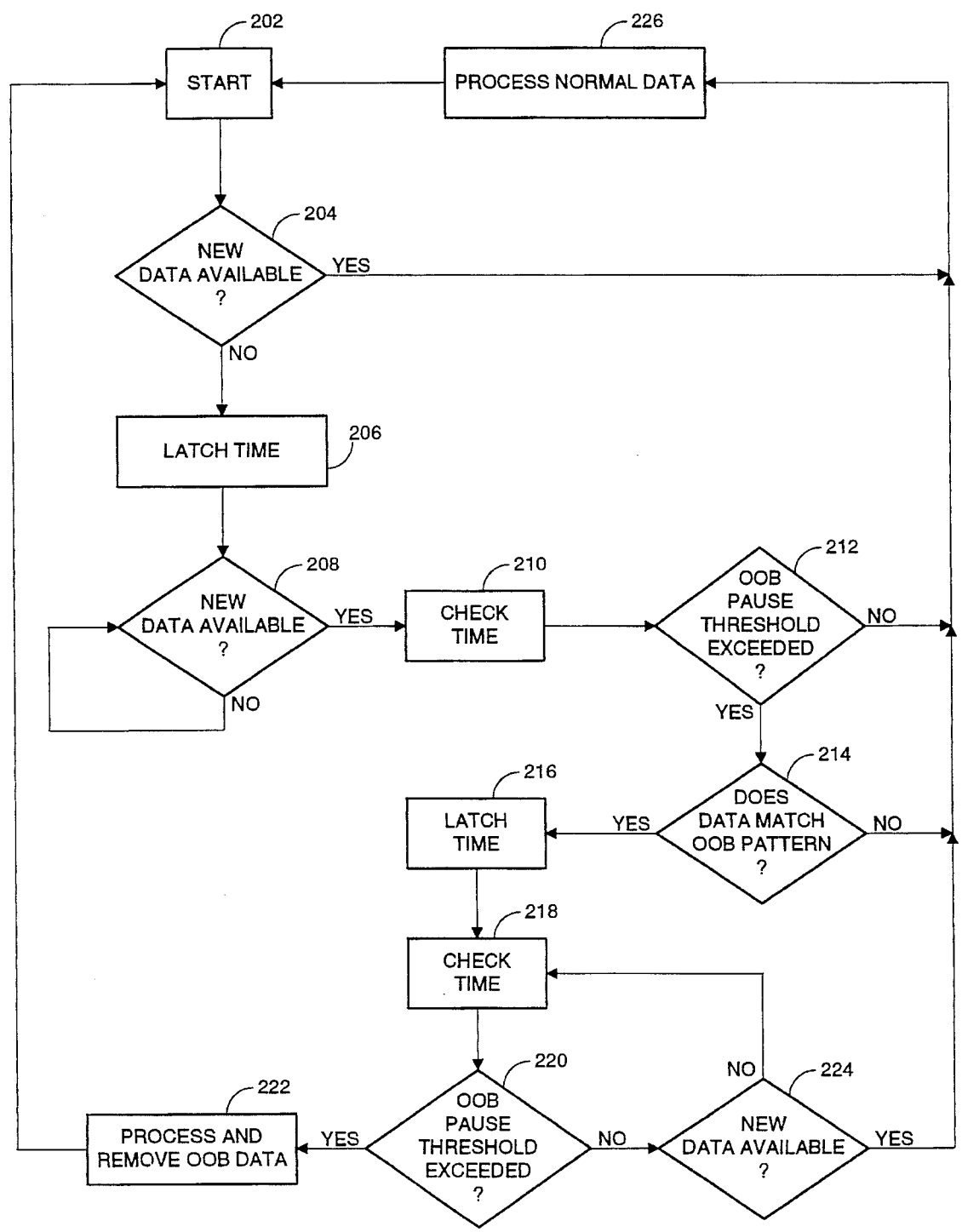
FIG. 2 is a flow diagram of OOB character recognition and processing, in accordance with the present invention.

Referring now to FIG. 2, there is shown a flow diagram of processing in accordance with the present invention. After processing starts 202, a check 204 is made to determine whether new data are immediately available. If so, the new data are processed 226 as normal data and processing returns to the start 202. If not, the time is latched 206, and another check 208 continues to be made to determine whether new data are available. At the point that such new data are available, the time is checked 210, and a check 212 is made as to whether a first OOB pause threshold has been exceeded since the time was latched 206. If not, the data are processed 226 as normal data, and processing returns to the start 202.

If the first OOB pause threshold has been exceeded, a check 214 is made to determine whether the current data match any of the known patterns of OOB data supported by printer 100. If not, the data are processed 226 as normal data. If a match is found, the time is latched 216, the time is checked 218, and a check 220 is made to determine whether a second OOB pause threshold has been exceeded. If the second threshold has not been exceeded, a check 224 is made to determine whether new data are yet available. If so, the current data are processed 226 as normal data, and processing returns to the start 202. Otherwise, the time is checked again 218 and processing circulates among time check 218, threshold check 220, and new data check 224 until new data check 224 indicates that new data are available or the threshold check 220 indicates that the second OOB pause threshold is exceeded. If new data are available, the current data are processed 226 as normal data, as described above. If the second OOB pause threshold is exceeded, the OOB data are processed and removed 222, and processing returns to the start 202. As described in connection with FIG. 1, OOB data are processed by generating an OOB signal in response to detection of OOB data, using OOB event generator 114.

As described in connection with FIG. 1, variations in the processing described herein may be made in accordance with the present invention. For example, either one, rather than both, of the pause thresholds may be examined, or the check for whether the current data match an OOB pattern may be made after the two thresholds checks are made. Other variations should also be apparent. For instance, the processing described herein may be performed in addition to other processing of OOB data. Specifically, a conventional check within each of the PLIs can still be made to eventually process any OOB data that, for one reason or another, does not appear in a time-isolated fashion from preceding to succeeding data.

From the above description, it will be apparent that the invention disclosed herein provides a novel and advantageous system and method of detecting and processing OOB information in a printer data stream. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A printer for printing image data provided by one or more attached computers, the printer comprising:

a first pause detector for determining a first pause relative to a portion of the image data and producing as output an OOB candidate in response to the first pause exceeding a first duration;

an OOB character recognizer, the OOB character recognizer being coupled to the first pause detector and receiving therefrom the OOB candidate, the OOB character recognizer producing as output a recognition signal indicating recognition of an OOB character in response to correspondence between the OOB candidate and a set of known OOB characters; and an OOB event generator coupled to the OOB character recognizer, the OOB event generator producing an OOB signal corresponding to the OOB character in response to the recognition signal produced by the OOB character recognizer.

2. A printer for printing image data provided by one or more attached computers, the printer comprising:

a first pause detector for determining a first pause preceding a portion of the image data;

a second pause detector for determining a second pause following the portion of the image data;

an OOB character recognizer for comparing the portion of the image data with a set of known OOB characters and producing a recognition signal in response to correspondence between the portion of the image data and one of the set of known OOB characters; and an OOB event generator, coupled to the first pause detector, the second pause detector, and the OOB character recognizer, the OOB event generator generating an OOB signal in response to the first pause exceeding a first duration, the second pause exceeding a second duration, and in response to the recognition signal produced by the OOB character recognizer indicating correspondence between the portion of the image data and one of the set of known OOB characters.

3. A process for recognizing OOB characters in a data stream, said data stream being provided to a printer by one or more attached computers, the process comprising:

measuring a pause in the data stream relative to a portion of the data stream;

tagging the portion of the data stream as a possible OOB character in response to the pause exceeding a predetermined duration; and recognizing the portion of the data stream as an actual OOB character in response to correspondence of the possible OOB character with one of a set of known OOB characters.

4. A process as in claim 3, wherein the pause precedes the portion of the data stream.

5. A process as in claim 3, wherein the pause follows the portion of the data stream.

6. A process for recognizing OOB characters in a data stream, said data stream being provided to a printer by one or more attached computers, the process comprising:

measuring a first pause in the data stream preceding a portion of the data stream;

measuring a second pause in the data stream following the portion of the data stream; and recognizing the portion of the data stream as an actual OOB character in response to the first pause exceeding a first duration, the second pause exceeding a second duration, and correspondence between the portion of the data stream and one of a set of known OOB characters.

* * * * *

UNITED STATES PATENT AND TRADEMARK OFFICE
CERTIFICATE OF CORRECTION

PATENT NO. : 5,555,350
DATED : September 10, 1996
INVENTOR(S) : Strauss

It is certified that error appears in the above-indentified patent and that said Letters Patent is hereby corrected as shown below:

On the title page, item [54] delete "OUT -OF-BANK CHARACTERS' and insert -- OUT-OF-BAND CHARACTERS--.

Column 1, line 3, delete "OUT-OF-BANK CHARACTERS' and insert --OUT-OF-BAND CHARACTERS--.

Column 3, line 33 delete "at input 103" and insert --at input ports 103--.

Signed and Sealed this

Fourth Day of February, 1997

Attest:

BRUCE LEHMAN

*Attesting Officer*  *Commissioner of Patents and Trademarks*